United States Patent

Hagiwara et al.

[11] Patent Number: 5,878,251
[45] Date of Patent: Mar. 2, 1999

[54] COMPUTER SYSTEM AND STOP CLOCK SIGNAL CONTROL METHOD FOR USE IN THE SYSTEM

[75] Inventors: Yuko Hagiwara, Tokyo; Tsukasa Matoba, Kawasaki, both of Japan

[73] Assignee: Kabushiki Kaisha Toshiba, Kawasaki, Japan

[21] Appl. No.: 808,415

[22] Filed: Feb. 28, 1997

[30] Foreign Application Priority Data

Mar. 1, 1996 [JP] Japan .................................. 8-044919

[51] Int. Cl.$^6$ .............................. G06F 1/04; G06F 1/32
[52] U.S. Cl. ...................................... 395/560; 395/750.04
[58] Field of Search .................. 395/560, 750.03–750.05

[56] References Cited

U.S. PATENT DOCUMENTS

| | | | |
|---|---|---|---|
| 4,748,559 | 5/1988 | Smith et al. | 395/560 |
| 4,851,987 | 7/1989 | Day | 395/560 |
| 5,025,387 | 6/1991 | Franc | 395/560 |
| 5,546,568 | 8/1996 | Bland et al. | 395/560 X |
| 5,692,197 | 11/1997 | Narad et al. | 364/707 X |

*Primary Examiner*—Thomas M. Heckler
*Attorney, Agent, or Firm*—Finnegan, Henderson, Farabow, Garrett & Dunner, L.L.P.

[57] ABSTRACT

In the interval stop clock mode, the stop clock generating circuit in the system controller generates a stop clock signal that alternates between the active state and the inactive state and supplies the signal to the CPU. This causes the CPU to alternate between a state where the CPU is stopped from executing an instruction and an instruction executable state. In such a computer system, an interrupt type sensing circuit senses various interrupt request signals generated in the system and determines the type of each interrupt request. A stop clock temporary stopping circuit controls the stop clock generating circuit so as to bring the stop clock signal in the inactive state for the period of time specified by the timer value stored in the register corresponding to the determined type of the interrupt request. With this configuration, the performance of the CPU is prevented from falling off in a case where a load is exerted on the CPU as a result of a hardware interrupt to the CPU having occurred in the interval stop clock mode.

20 Claims, 4 Drawing Sheets

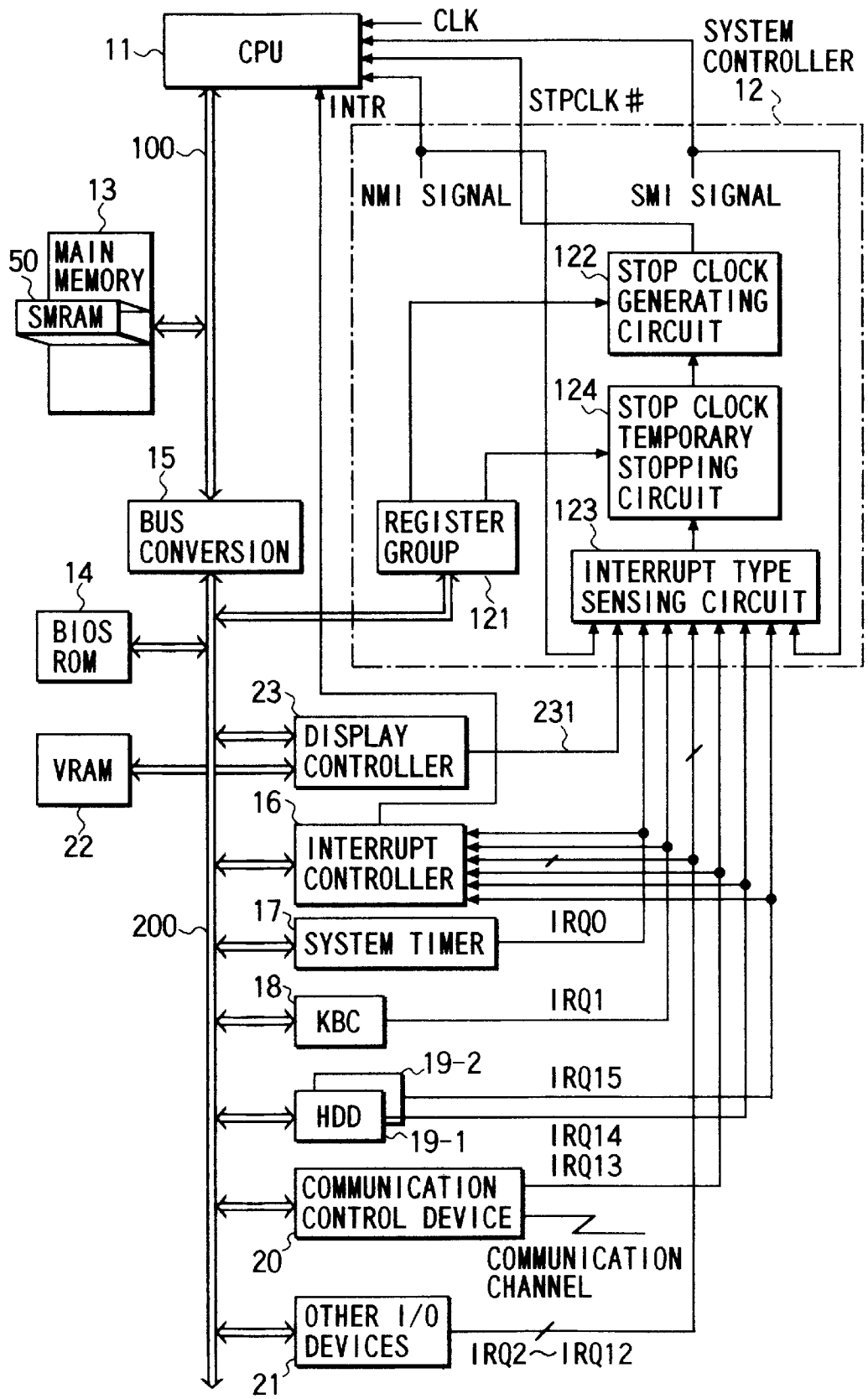
F I G. 2

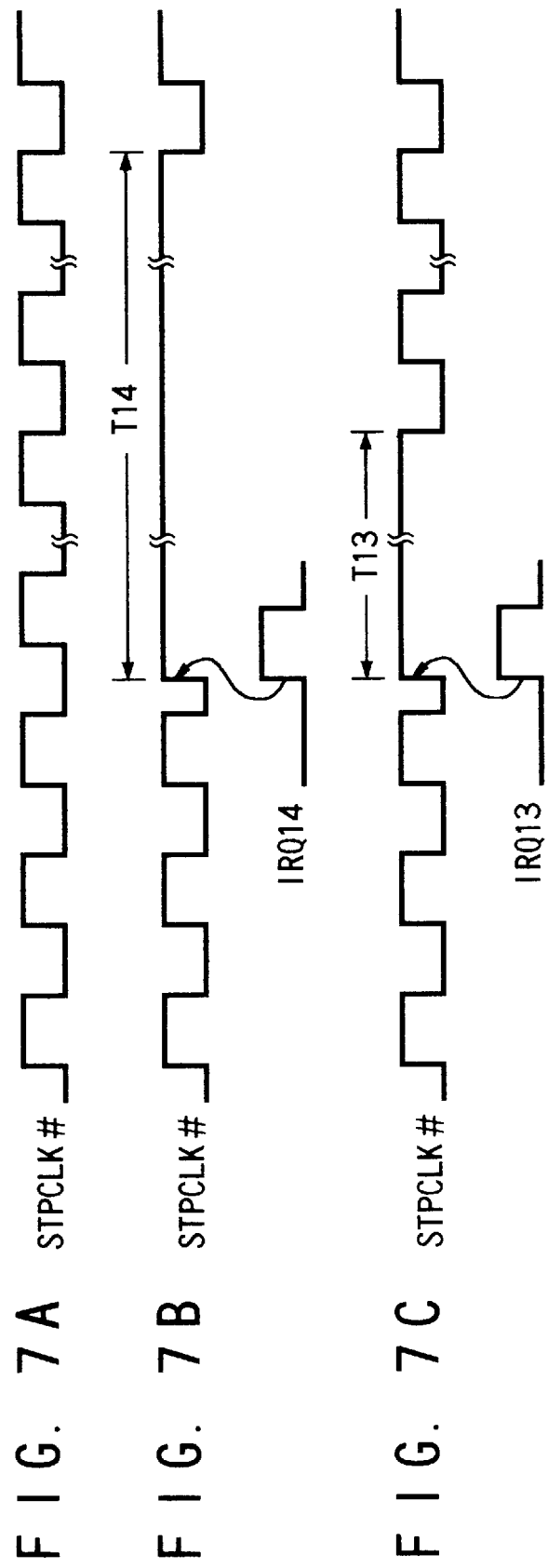

COMPUTER SYSTEM AND STOP CLOCK SIGNAL CONTROL METHOD FOR USE IN THE SYSTEM

BACKGROUND OF THE INVENTION

The present invention relates to a portable personal computer of the laptop type or the notebook type, and more particularly to a computer system having the function of controlling the operating speed of the CPU by means of a stop clock signal for reducing power consumption and to a stop clock signal control method for use in the system.

In recent years, various portable personal computers of the laptop type or the notebook type have been developed. With this type of computer, as shown in FIG. 1A, the system controller 32 supplies to the CPU 31 a signal, called a stop clock signal (signal STPCLK#), for controlling the operating speed of the CPU 31. Depending on the logical state of the signal STPCLK#, the CPU 31 is temporarily stopped from executing an instruction, thereby reducing the power consumption.

To realize a reduction in the power consumption by using the signal STPCLK#, the computer system of FIG. 1A is provided with a specific mode called interval stop clock mode.

The user can choose the mode on the setup screen. When the mode is chosen, the controller 32 outputs to the CPU 31 the signal STPCLK# that alternates between an active period (in low level) and an inactive period (in high level) (e.g., at intervals of 32 $\mu$s). According to the alternation of signal STPCLK# between the active period and the inactive period, the CPU 31 alternates between a first state in which the CPU is temporarily stopped from executing an instruction and a second state in which the CPU is allowed to execute the instruction.

As described above, in the interval stop clock mode, the CPU 31 alternates between the temporary stop period of instruction execution and the instruction executable period, thereby assuring the reduction of power consumption. Because the CPU stops executing an instruction intermittently, but not completely, it can perform processing, although the speed is low and therefore the performance falls off. Therefore, the interval stop clock mode is a useful function when the user uses the computer system operating on a battery.

With a conventional computer system, however, once the interval stop clock mode has been set, the CPU is temporarily stopped intermittently, regardless of the state of the CPU. As a result, when a load is applied to the CPU, the CPU has the disadvantage of degrading the performance. The degradation of the CPU's performance is a problem, especially when a high-speed hardware device (I/O device), such as a hard disk drive (HDD), has triggered an interrupt to the CPU.

BRIEF SUMMARY OF THE INVENTION

Accordingly, it is an object of the present invention to provide a computer system that prevents the performance of the processor from falling off, even if a hardware interrupt occurs when a load is being applied to the processor in the interval stop clock mode for reducing power consumption, and a clock stop signal control method for use in the system.

According to a first aspect of the present invention, there is provided a computer system comprising: a processor capable of operating in an interval stop clock mode in response to a stop clock signal; and a controller capable of supplying the stop clock signal to the processor, including means for, when an interrupt request to the processor has generated in the system, sensing the request and forcibly modifying the stop clock signal to be supplied such that the processor may perform an interrupt process continuously for a predetermined period of time.

With the system, the stop clock signal with the period of time having not been set alternates between a first logical state where the processor is temporarily stopped from executing an instruction and a second logical state where the processor is allowed to execute the instruction. It is desirable that the stop clock signal with the period of time having been set should be forced to remain in the second logical state for the period of time having been set. In this case, the controller may include means for determining the period of the second logical state. It is desirable that the determining means should make the period of the second logical state longer according as a device that generates the interrupt request can operate at higher speed. Furthermore, the controller may further include means for, when an image memory access request has generated in the system, sensing the access request as a kind of the interrupt request.

According to a second aspect of the present invention, there is provided a computer system comprising: a processor capable of operating in an interval stop clock mode in response to a stop clock signal; and a controller capable of supplying the stop clock signal to the processor, including: a sensing circuit for, when an interrupt request to the processor has generated in the system, sensing the type of the interrupt request; a determining circuit for determining the period of time during which the processor should perform an interrupt process continuously in accordance with the type sensed by the sensing circuit; and a generating circuit for generating a stop clock signal for which the period of time determined by the determining circuit has been set.

With the system, the stop clock signal with the period of time having not been set alternates between a first logical state where the processor is temporarily stopped from executing an instruction and a second logical state where the processor is allowed to execute the instruction. It is desirable that the stop clock signal with the period of time having been set should be forced to remain in the second logical state for the period of time having been set. Moreover, it is desirable that the determining means should make the period of the second logical state longer according as a device that generates the interrupt request can operate at higher speed. Furthermore, the controller may include a register for storing the correspondence between the type of each interrupt request generated in the system and the period of the second logical state. In this case, the determining circuit refers to the register when making the determination. The interrupt requests generated in the system may include an SMI (System Management Interrupt) or an NMI (Non-Maskable Interrupt). The sensing circuit may be designed to sense an image memory access request as a kind of the interrupt request, when the access request has generated in the system.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram of the overall configuration of a computer system according to an embodiment of the present invention;

FIGS. 7A to 7C are timing charts to help explain the details of signal STPCLK# for controlling the operating speed of the CPU 11 in a case where the computer system of FIG. 2 is set in the interval stop clock mode.

DETAILED DESCRIPTION OF THE INVENTION

Figure 1A:
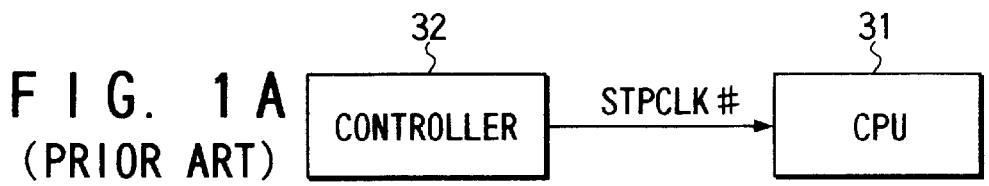
FIGS. 1A and 1B are diagrams to help explain signal STPCLK# for controlling the operating speed of the CPU when a conventional computer system is set in the interval stop clock mode.

To make it easier to understand the present invention, the basis idea of the present invention will be explained briefly before detailed explanation of an embodiment of the invention.

With a computer system according to a first aspect of the present invention, when a hardware interrupt to the CPU has occurred in the interval stop clock mode, signal STPCLK# is forcibly brought into a second logical state (inactive state), which puts the CPU in the instruction executable state during the period of the second logical state, enabling an interrupt process that exerts a load onto the CPU. This makes it possible to prevent the performance of the CPU from falling off during the interrupt process, while the reduction of the power consumption is basically assured.

With a computer system according to a second aspect of the present invention, when a hardware interrupt to the CPU has occurred in the interval clock mode, signal STPCLK# is forcibly brought into a second logical state (inactive state). The period of the second logical state is changed in accordance with the type of interrupt request in such a manner that the faster the speed of a device that has generated the interrupt request, the longer the period is set. Specifically, with the computer system according to the second aspect, when an interrupt has been triggered by a high-speed device, there is a strong possibility that the process of the CPU will take place successively, so the period (snap time) during which signal STPCLK# is forcibly brought into the inactive state is set longer. In contrast, when an interrupt has been triggered by a low-speed device, because the temporary stop of the processing of the CPU after the interruption does not lead to a drop in the performance, the period during which signal STPCLK# is forcibly made inactive is set shorter.

As described above, a distinction is made between an interrupt request from a high-speed device (e.g., hard disk drive) and an interrupt request from a low-speed device. Then, as the interrupt process exerts a heavier load on the CPU, the period during which signal STPCLK# is forcibly brought into the inactive state is made longer, thereby preventing the performance from falling off in the interrupt process, while basically reducing the power consumption.

With the above-described computer system, for example, when an image memory access, such as a VGA (Video Graphic Array) access, has occurred, there is a strong possibility that a large volume of display data will be transferred. If the generation of an image memory access request is sensed and the sensed access request is treated as a kind of interrupt request signal, signal STPCLK# can be forcibly made inactive during the period corresponding to the image memory access, thereby preventing the performance from falling off during the image memory access.

Hereinafter, referring to the accompanying drawings, an embodiment of the present invention will be explained in detail.

FIG. 2 is a block diagram of the overall configuration of a computer system according to an embodiment of the present invention.

The computer system, which is a personal computer system of, for example, the laptop type or the notebook type that can be powered by a battery, comprises a CPU 1, a system controller 12, a main memory 13, a BIOS ROM (Basic I/O System ROM) 14, and a bus conversion circuit 15.

The CPU 11 and main memory 13 are connected to a CPU bus 100 including a 62-bit data bus. The CPU 100 is connected via the bus conversion circuit 15 to a system bus 200 complying with the PCI (Peripheral Component Interconnect) specification, including a 32-bit data bus.

The system further comprises an interrupt controller 16, a system timer 17, a keyboard controller (KBC) 18, two hard disk drives (HDDS) 19-1, 19-2, a communication control device 29, such as a LAN card, and other various types of I/O devices 21. These devices are connected to the system bus 200 via a system bus conforming to the ISA (Industry Standard Architecture) specification and a bus bridge device (which are not shown).

The system further comprises a VRAM (Video RAM) 22 and a disk play controller 23. The disk play controller 23 is connected to the system bus 200.

Figure 1B:
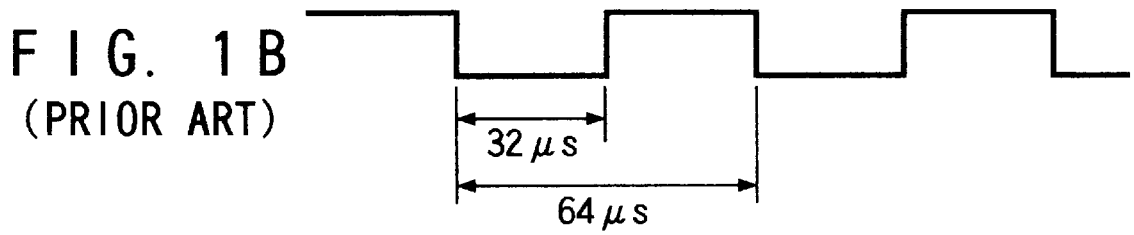

A microprocessor, such as a Intel's Pentium processor, is used as the CPU 11. The CPU 11 has an input terminal for stop clock signal (signal STPCLK#). The operating speed of the CPU 11 is controlled by signal STPCLK# inputted to the terminal. For example, in the interval stop clock mode in which signal STPCLK# alternates between the active state (low level) and the inactive state (high level) as shown in FIG. 1B, the CPU 11 alternates between a first state in which the CPU is temporarily stopped from executing an instruction and a second state in which the CPU is allowed to execute the instruction in accordance with the alternation of signal STPCLK# between the active state and the inactive state. Although this decreases the operating speed of the CPU, it reduces the power consumption. In addition to this, because the CPU 11 is in the second state where the CPU is allowed to execute an instruction in the normal mode in which signal STPCLK# is always set in the inactive state, the CPU enables high-speed processing, although consuming more electric power.

Furthermore, the CPU 11 has the following system management function.

In addition to the modes (real modes) for executing programs including application programs and the OS, the CPU 11 has an operation mode, called system management mode (SMM), for executing system management programs for system management or electric power management. The system management mode (SMM) is set when the system controller 12 has generated a system management interrupt (SMI) to the CPU 11. In the SMM, a system management program for system management or power saving control is executed.

The SMI is a kind of non-maskable interrupt NMI and has top priority, that is, has priority over normal NMI and maskable interrupt INTR. Initiating the SMI enables the various SMI service routines prepared as system management programs to start without depending on the application program currently being executed or the OS environment. Although there are several factors that cause the SMI to occur, they are not directly related to the present invention, so explanation of them will not be given. Furthermore, an NMI occurs due to the factors that generate an NMI, such as an I/O channel check. The factors, too, are not directly related to the present invention, so explanation of them will not be given.

The main memory 13 stores an operating system, application programs to be processed, and the user data created by the application programs. An SMRAM (System Management RAM) 50 is an overlay mapped onto the address space ranging from address 30000H to 3FFFFH (H at the end represents a hexadecimal representation) in the main memory 13 and can be accessed when the SMI signal is inputted to the CPU 11.

When the CPU 11 goes into the SMM, the status of the CPU, that is, the data in the registers of the CPU 11 at the time when the SMI has occurred, is saved in the SMRAM 50 in stack form. In the SMRAM 50, an instruction to call the system management program in the BIOS ROM 14. This instruction is an instruction that is to be executed first when the CPU 11 enters the SMM. As a result of the execution of the instruction, control is passed to the system management program.

The BIOS ROM 14 stores the BIOS and is composed of a flash memory that enables the rewriting of programs. The BIOS is designed to operate in the real mode. The BIOS includes an IRT (Initialize and Reliability Test) routine to be executed at the time of system boot, a device driver for controlling various I/O devices, and a system management program. The system management program is a program executed in the SMM.

The bus conversion circuit 15 performs bus width conversion between the 62-bit data bus of the CPU 100 and the 32-bit data bus of the system bus 200.

The interrupt controller 16 receives the hardware interrupt request signals IRQ0 to IRQ15 from the system timer 17, keyboard controller 18, hard disk drivers 19-1, 19-2, communication control device 20, and other I/O device 21 and controls the generation of interrupt signal INTR in accordance with the order of priority of the interrupt request signals. In this case, the status information indicating the type of the generated interrupt request is stored in the status register in the interrupt controller 16. The interrupt signal INTR is generated when any one of the hardware interrupt request signals (IRQ0 to IRQ15) has been generated.

Here, IRQ0 is a timer interrupt request signal generated by the system timer 17 at intervals of, for example, 55 milliseconds. IRQ1 is a keyboard interrupt request signal generated by the keyboard controller 18 at the time of key input. IRQ13 is an interrupt request signal from the communication control device 20. IRQ14 and IRQ15 are interrupt request signals from (the controllers of) the hard disk drives 19-1 and 19-2. IRQ2 to IRQ12 are interrupt request signals from the other various I/O devices 21 in the system, including, for example, an interrupt request signal generated at the time when the mouse is operated.

The VRAM 22 stores the display data to be displayed on a display (not shown).

A display controller (graphics controller) 23 sets horizontal and vertical frequencies to determine the resolution with which images appear on the display and controls the screen display by accessing the VRAM 22 in accordance with the resolution. The display controller 23 senses the access request of the CPU 11 to VRAM 22, such as VGA access request, and outputs a VRAM access sensing signal 231.

Next, the hardware configuration that is provided in the system controller 12 and is designed to control signal STPCLK# directly related to the present invention.

The system controller 12, which is composed of, for example, a gate array, includes a register group (I/O register group) 121, a stop clock generating circuit 122, an interrupt type sensing circuit 123, and a stop clock temporary stopping circuit 124.

The register group 121 includes a set of registers that can be read and written from and into by the CPU 11. Set in each of registers in the register group 121 are a timer value specifying the period (snap time) during which signal STPCLK# should be forcibly set in the inactive state when a corresponding interrupt request has generated in the interval stop clock mode, and status information indicating the state of the corresponding interrupt request.

Further, the register group 121 can be set with a specific command for causing the stop clock generating circuit 122 to generate signal STPCLK# with the same waveform as that of FIG. 1B in the interval stop clock mode.

Figure 3:
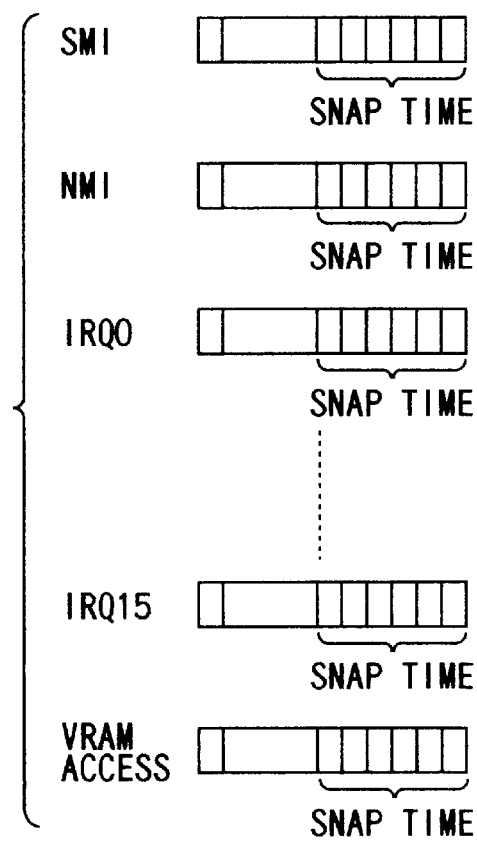
FIG. 3 shows an example of the organization of the register group in the system controller of FIG. 2.

FIG. 3 shows an example of the organization of the register group 121. Specifically, the register group 121 is designed to correspond to each of the interrupt request signals, including SMI, NMI, IRQ0 to IRQ15, and VRAM access sensing signal and allow the timer values (snap time) etc. to be set in the group. Each time value is expressed by, for example, six bits. In each register, information indicating whether or not the timer value that has been set is valid is expressed by one bit. The information is set by the BIOS. Although in addition to this, the aforementioned specific command and status information have been stored in the registers, they are not shown in FIG. 3.

When the CPU 11 has set the specific command in the register group 121, the stop clock generating circuit 122 generates signal STPCLK# that has basically the same waveform as that of FIG. 1B. When receiving a certain request from the stop clock temporary stopping circuit 124 explained later, the stop clock generating circuit generates signal STPCLK# that has a different waveform from that of FIG. 1B as explained later.

The stop clock generating circuit 122 is designed to take in a stop grant signal (a kind of command) outputted from the CPU 11, by way of a decoder. The stop grant signal is not outputted immediately after the interrupt process has been completed, but is generated after a predetermined preparation has been made in the CPU 11.

The interrupt type sensing circuit 123 senses the various types of hardware interrupt request signals IRQ0 to IRQ 15, SMI, NMI generated in the system, and determines the types of the interrupt requests. When a plurality of interrupt request signals have been sensed at the same time, the type of the interrupt request signal with the highest priority among them is determined. Furthermore, the interrupt type sensing circuit 123 treats a VRAM access sensing signal 231 from the display controller 23 as an interrupt request signal, senses the generation of the signal 231, and determines the type of the signal. The result of determining the type at the interrupt type sensing circuit 123 is sent to the stop clock temporary stopping circuit 121 via a specific signal line.

The interrupt type sensing circuit 123 receives various IRQ signals and VRAM access sensing signal 231 as well as the SMI signal and NMI signal generated in the system controller 12.

In the interrupt type sensing circuit 123, a circuit (not shown) that puts the inputted various interrupt request signals together into a single signal is provided. When any interrupt request signal is not inputted, the circuit will issues a break event. The output of the circuit is sent from the interrupt type sensing circuit 123 via the stop clock temporary stopping circuit 124 to the stop clock generating circuit 122 through a single signal line.

When the interrupt type sensing circuit 123 has sensed an interrupt request signal in the interval stop clock mode, the stop clock temporary stopping circuit 124 controls the stop clock generating circuit 122 so as to forcibly bring the signal STPCLK# into the inactive state during the period specified by the timer value set in the register 121 corresponding to the type of the interrupt request. In this case, actual control is executed by sending various snap enable signals via the control line provided for each of IRQ0 to IRQ 15, SMI, and NMI, between both circuits.

Figure 4:
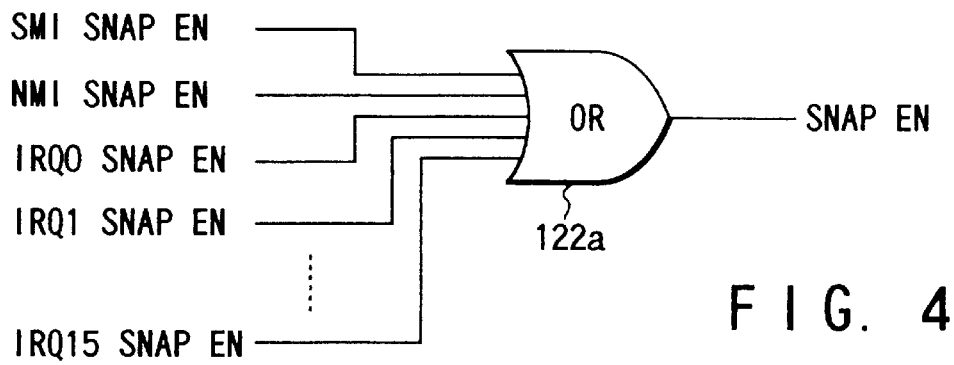
FIG. 4 shows the structure of an OR circuit provided in the stop clock generating circuit in the system controller of FIG. 2.

In the stop clock generating circuit 122, an OR circuit 122a that puts the various snap enable signals from the plurality of control lines together into a single signal line is provided. FIG. 4 shows the configuration of the OR circuit 122a. If any interrupt request generates, the OR circuit 122a will output the single snap enable signal. In this case, the stop clock generating circuit 122 has forcibly brought signal STPCLK# into the inactive state.

Figure 5:
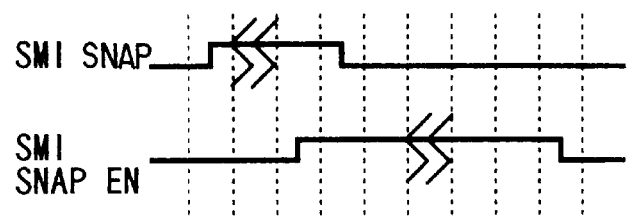
FIG. 5 illustrates the flow of timing during the time from when an SMI signal is outputted in the system controller of FIG. 2 until a signal (SMI snap enable signal) for making signal STPCLK# inactive is actually inputted to the stop clock generating circuit.

FIG. 5 shows the flow of timing from when an SMI signal has been generated in the system controller 12 until a signal (SMI snap enable signal) for bringing signal STPCLK# into the inactive state is actually inputted to the stop clock generating circuit. The reason why there is a time delay between the two signals is that it takes time to complete the processing (including sensing the type of interrupt request) at the interrupt type sensing circuit 123 and the processing (including referring to the timer value from the register) at the stop clock temporary stopping circuit 124. This is not limited to the SMI signal. A similar time delay to that shown in FIG. 5 is found in other types of interrupt request signals.

Figure 6:
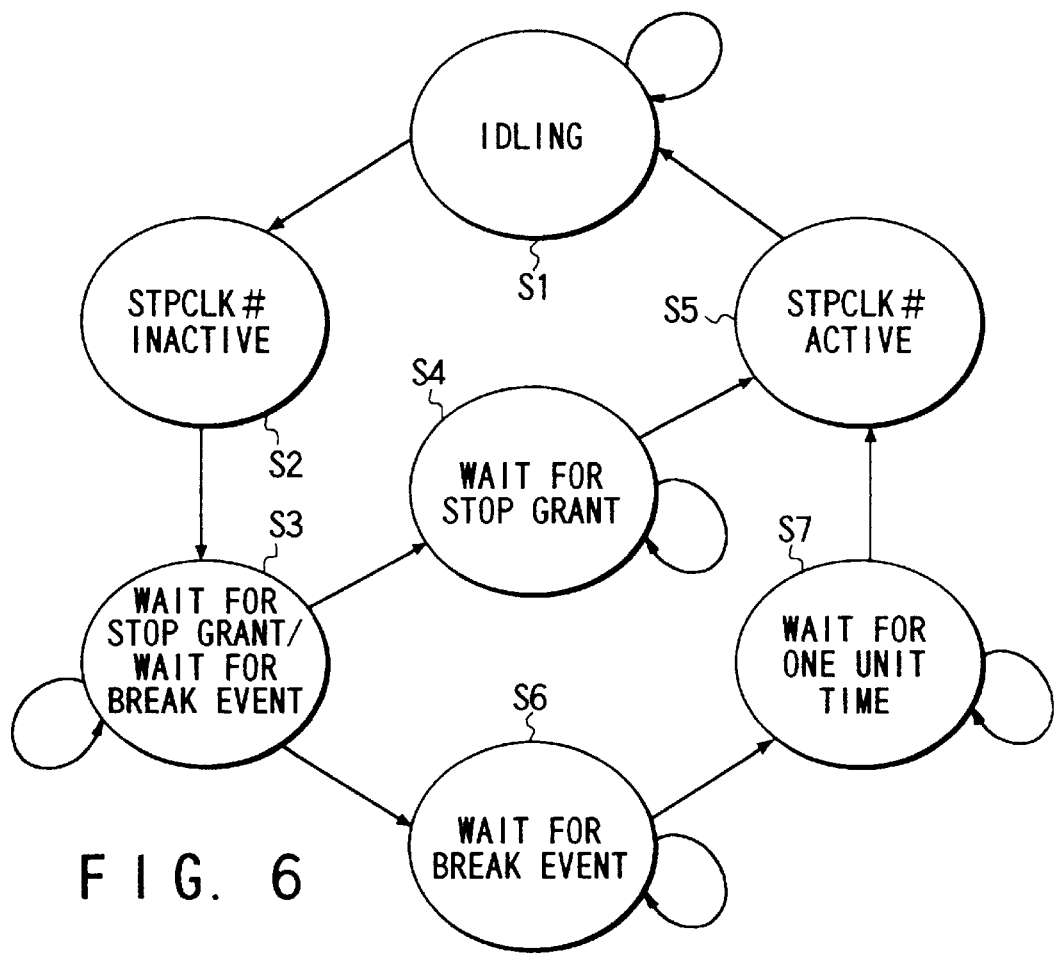
FIG. 6 shows the transition of states of the stop clock generating circuit in the system controller of FIG. 2.

Next, the transition of states in the stop clock generating circuit 122 will be explained by reference to FIG. 6. The stop clock generating circuit 122 is now in the idle state in which it has not made signal STPCLK# inactive (step S1). Then, at a point in time, the stop clock temporary stopping circuit 124 requires the stop clock generating circuit 122 to make STPCLK# inactive and the stop clock generating circuit forcibly sets STPCLK# in the inactive state for a specified period of time (step S2). Thereafter, the stop clock generating circuit 122 waits for a stop grant by the CPU 11 or a break event (step S3).

When having received a break event first, the stop clock generating circuit 122 waits for a stop grant from the CPU 11 (step S4). Then, after receiving a stop grant, the stop clock generating circuit 122 brings STPCLK# into the active state (step S5), and returns to the idle state.

At step S3, when having received a stop grand from the CPU 11 first, the stop clock generating circuit 122 waits for a break event thereafter (step S6). Then, the stop clock generating circuit 122, receiving a break event, waits for one unit time to elapse (step S7), thereafter brings STPCLK# into the active state (step S5), and then returns to the idle state.

Next, the details of signal STPCLK# that controls the operating speed of the CPU 11 when the computer system of FIG. 2 is set in the interval stop clock mode will be described by reference to the timing charts in FIGS. 7A to 7C.

First, the interval stop clock mode is set by the user choosing the mode on the setup screen as described earlier in the prior art. The setting process is carried out by the CPU 11 executing a specific routine in the BIOS ROM 14.

When the user has chosen the interval stop clock mode for assuring the reduction of power consumption, the CPU 11 sets the specific command (for causing signal STPCLK# to have the same waveform as that of FIG. 1B) and the timer value (the timer value that specifies the period during which signal STPCLK# should be forcibly set in the inactive state) for each type of interrupt request (including VRAM access sensing signal 231) in the register group 121 in the system controller 12. As a higher-speed device generates an interrupt request, a larger value is selected as the timer value in the range of, for example, $2^0$ (=1) ms, $2^1$ (=2) ms, $2^2$ (=4) ms, ..., $2^{10}$ (=1024) ms. For example, the timer values T14, T15 corresponding to the interrupt request signals IRQ14, IRQ15 from the hard disk drives 19-1, 19-2 are set at values sufficiently larger than the timer value T13 corresponding to the interrupt request signal IRQ13 from the communication control device 20.

When the specific command is set in the register group 121, the stop clock generating circuit 122 in the system controller 12 generates signal STPCLK# that alternates between the active state (low level) and the inactive state (high level) as shown in FIG. 7A. The period of the signal STPCLK# is 64 µs as in FIG. 1B of the prior art. The period of the active state and that of the active state are both 32 µs.

The signal STPCLK# is supplied to (the STPCLK# terminal of) the CPU 11. The CPU 11 temporarily stops executing the instruction for the period during which signal STPCLK# supplied from the stop clock generating circuit 122 is in the active state and goes into the instruction executable state and executes the instruction during the period during which the STPCLK# is in the inactive state.

As described above, in the interval stop clock mode, the CPU 31 assures the reduction of power consumption by alternating between the temporary stop period and the instruction executable period. Because the CPU stops operation intermittently, not completely, it can perform the processing at low speed (although the performance falls off).

Suppose that in the interval stop clock mode, one of the hardware devices generates an interrupt request signal to the CPU 11.

The interrupt request signal is inputted to the interrupt controller 16 and simultaneously the interrupt type sensing circuit 123 in the system controller 12.

When having sensed the interrupt request signal and accepted the request, the interrupt controller 16 not only generates an interrupt signal INTR to the CPU 11 but also stores the status information indicating the type of the accepted interrupt request signal in the status register in the controller 16.

When having sensed the inputted interrupt request signal, the interrupt type sensing device 123 determines the type of the interrupt request signal (the type of interrupt request) and outputs information on the determined type of the interrupt request to the stop clock temporary stopping circuit 124.

Receiving the information on the type of interrupt request from the interrupt type sensing circuit 123, the stop clock temporary stopping circuit 124 reads the timer value set in the register in the register group 121 corresponding to the type of the interrupt request, sets the value in the internal timer, and starts the timer, and also requests the stop clock generating circuit 122 to bring signal STPCLK# into the inactive state.

Then, the stop clock generating circuit 122 forcibly sets signal STPCLK# in the inactive state until the timer in the stop clock temporary stopping circuit 124 has reached a time out, regardless of the specific command in the register group 121.

When a high-speed device, for example, hard disk drive 19-1, generates an interrupt request signal IRQ14, the stop clock temporary stopping circuit 124 does a time count of timer value T14, so that signal STPCLK# is set in the inactive state during the period of time T14 since the generation of the interrupt request signal.

To manage the period of signal STPCLK# in the interval stop clock mode, the stop clock generating circuit 122 counts the active period and inactive period at intervals of 32 μs as shown in FIG. 1B and returns to the state where it generates and outputs signal STPCLK# in accordance with the time count at the stop clock generating circuit 122, at the time when the time count (in this case, the count of T14) at the stop clock temporary stopping circuit 124 has ended.

On the other hand, when a low-speed device, for example, the communication control device 20, generates interrupt request signal IRQ13 (e.g., for accessing a network), the stop clock temporary stopping circuit 124 does a time count of timer value T13 (smaller than the timer value T14), so that signal STPCLK# is set in the inactive state during the period of time since the generation of the interrupt request signal as shown in FIG. 7C.

As a result of the interrupt controller 16 having accepted the interrupt request signal from the hardware device, the interrupt signal INTR generated at the controller 16 is inputted to the CPU 11. At this time, the signal STPCLK# outputted from the stop clock generating circuit 122 has been forcibly set in the inactive state in accordance with the sensing result of interrupt request at the interrupt type sensing circuit 123, with the result that the CPU1 does not stop the operation intermittently.

Therefore, in response to the interrupt signal INTR from the interrupt controller 16, the CPU 11 can immediately refer to the status information (information indicating the type of the interrupt request signal) stored in the status register of the controller 16 and start the corresponding transistor process.

Here, when a high-speed device, such as hard disk drive 19-1, has generated an interrupt request, the period during which signal STPCLK# is forcibly set in the inactive state is set longer as shown in FIG. 7B, which enables the CPU 11 to process the interrupt from the high-speed device without lowering the performance.

When a low-speed device, such as the communication control device 20, has generated an interrupt request, the period during which signal STPCLK# is forcibly set in the inactive state is set shorter as shown in FIG. 7C, giving priority to the reduction of power consumption. Since the number of interrupt requests from low-speed devices is smaller, the CPU can process the interrupts without lowering the performance.

Next, explanation will be given of a case where the CPU 11 makes an access request to the VRAM 22, such as VGA access request, in the interval stop clock mode.

In this case, the disk controller 23 senses the access request of the CPU 11 to the VRAM 22 and generates a VRAM access sensing signal 231. The VRAM access sensing signal 231 is directed to the interrupt type sensing circuit 123. When the display controller 23 has generated a VRAM access sensing signal 231, the interrupt type sensing circuit 123 senses it as a kind of hardware interrupt request signal, and outputs the information on the type of the interrupt request to the stop clock temporary stopping circuit 124.

When having received the interrupt type information indicating the VRAM access sensing signal from the interrupt type sensing circuit 123, the stop clock temporary stopping circuit 124 not only reads the timer value set in the register in the register group 121 corresponding to the type of the interrupt request, sets the value in the internal timer, and starts the timer, but also requests the stop clock generating circuit 122 to bring signal STPCLK# into the inactive state.

Then, the stop clock generating circuit 122 forcibly sets signal STPCLK# in the inactive state until the timer in the stop clock temporary stopping circuit 124 has reached a time out, that is, during the time set in accordance with the VRAM access sensing signal 231, regardless of the specific command set in the register group 121.

This enables the CPU 11 to transfer the display data to the VRAM 22 without lowering the performance even in the interval stop clock mode.

As described in detail, with the present invention, when a hardware interrupt to the CPU has occurred in the interval stop clock mode in which the stop clock signal (signal STPCLK#) for controlling the operating speed of the CPU alternates between the active state and the inactive state, signal STPCLK# is forced to be inactive, which makes it possible to perform interrupt processing without lowering the performance, while basically assuring the reduction of power consumption.

With the present invention, since when a hardware interrupt to the CPU has occurred in the interval stop clock mode, signal STPCLK# is forced to be inactive as a higher-speed device that exerts a heavier load on the CPU generates an interrupt request, the period of the inactive state is set longer. It is possible to prevent the performance of the CPU from falling off even in any interrupt processing, while basically assuring the reduction of power consumption.

Furthermore, with the present invention, even when an image memory access request, such as a VGA access request, has generated, making signal STPCLK# inactive enables a large volume of display data to be transferred without lowering the performance.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A computer system comprising:

a processor operating in an interval stop clock mode in response to a stop clock signal; and a controller supplying the stop clock signal, including means for, when an interrupt request to said processor has generated in said system, sensing the request and setting the stop clock signal to an inactive state to be supplied such that said processor performs an interrupt process continuously for a predetermined period of time.

2. A computer system according to claim 1, wherein the stop clock signal with the period of time having not been set alternates between a first logical state for temporarily stopping said processor from executing an instruction and a second logical state for enabling said processor to execute the instruction.

3. A computer system according to claim 2, wherein the stop clock signal with the period of time having been set is forced to remain in the second logical state during the period of time having been set.

4. A computer system according to claim 3, wherein said controller further includes means for determining the period of the second logical state in accordance with the type of the interrupt request.

5. A computer system according to claim 4, wherein the faster the speed of a device which generates the interrupt request is, the longer the period of the second logical state is set.

6. A computer system according to claim 1, wherein said controller further includes means for, when an image memory access request has generated in said system, sensing the access request as a kind of the interrupt request.

7. A computer system comprising:
   a processor operating in an interval stop clock mode in response to a stop clock signal; and
   a controller supplying the stop clock signal to said processor, including:
      a sensing circuit for, when an interrupt request to said processor has generated in said system, sensing the type of the interrupt request;
      a determining circuit for determining the period of time during which said processor performs an interrupt process continuously in accordance with the type sensed by said sensing circuit; and
      a setting circuit for setting a stop clock signal to an inactive state for the period of time determined by said determining circuit.

8. A computer system according to claim 7, wherein the stop clock signal with the period of time having not been set alternates between a first logical state for temporarily stopping said processor from executing an instruction and a second logical state for enabling said processor to execute the instruction.

9. A computer system according to claim 8, wherein the stop clock signal with the period of time having been set is forced to remain in the second logical state during the period of time having been set.

10. A computer system according to claim 9, wherein the faster the speed of a device which generates the interrupt request is, the longer the period of the second logical state is set.

11. A computer system according to claim 9, wherein said controller further includes a register for holding the correspondence between the type of each interrupt request generated in said system and the period of the second logical state.

12. A computer system according to claim 11, wherein said determining circuit refers to said register when making the determination.

13. A computer system according to claim 7, wherein the interrupt requests generated in said system include an SMI (System Management Interrupt).

14. A computer system according to claim 7, wherein the interrupt requests generated in said system include an NMI (Non-Maskable Interrupt).

15. A computer system according to claim 7, wherein said sensing circuit, when an image memory access request has generated in said system, senses the access request as a kind of the interrupt request.

16. A computer system comprising:
   a processor with a stopped operation clock while a stop clock signal to the processor is in an active state, thereby reducing power consumption in the system; and
   a controller for, when an interrupt request to said processor is generated, sensing the type of request and setting the stop clock signal to an inactive state for a period of time according to the sensed type.

17. A computer system according to claim 16, wherein said controller supplies to the processor a stop clock signal alternating between an active state and an inactive state when an interrupt request to said processor is not generated.

18. A computer system according to claim 16, further comprising a register in which the period of the inactive state is set in accordance with a type of the interrupt request, said controller referring to said register and setting the stop clock signal at the inactive state continuously for the period of time according to the type of the interrupt request.

19. A stop clock signal control method for use in a computer system comprising a processor operating in an interval stop clock mode in response to a stop clock signal and a controller supplying the stop clock signal to said processor, said method comprising the steps of:
   sensing an interrupt request, when the interrupt request to said processor has generated in said system; and
   setting the stop clock signal supplied from said controller to an inactive state in accordance with the sensing result such that said processor performs an interrupt process continuously for a predetermined period of time.

20. A stop clock signal control method for use in a computer system comprising a processor operating in an interval stop clock mode in response to a stop clock signal and a controller supplying the stop clock signal to said processor, said method comprising the steps of:
   sensing the type of an interrupt request, when the interrupt request to said processor has generated in said system;
   determining the period of time during which said processor performs an interrupt process continuously in accordance with the sensed type; and
   causing said controller to set a stop clock signal to an inactive state for the determined period of time.

* * * * *